Jan. 18, 1944. G. E. HULSE 2,339,737
INFESTATION DESTRUCTION
Filed Jan. 14, 1942 4 Sheets-Sheet 2

INVENTOR
George E. Hulse
BY
Blair, Curtis + Hayward
ATTORNEYS

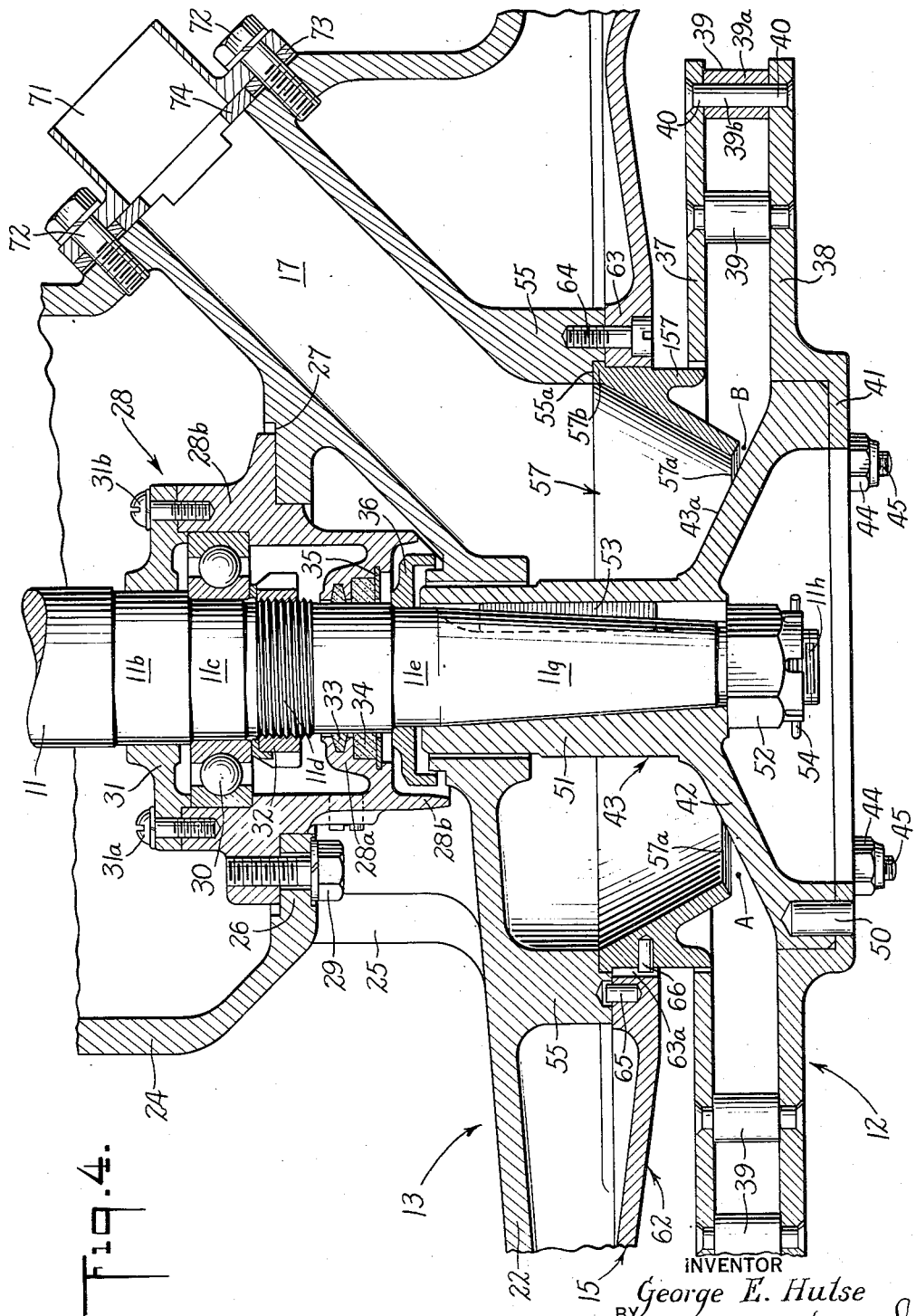

Jan. 18, 1944.   G. E. HULSE   2,339,737
INFESTATION DESTRUCTION
Filed Jan. 14, 1942   4 Sheets-Sheet 4
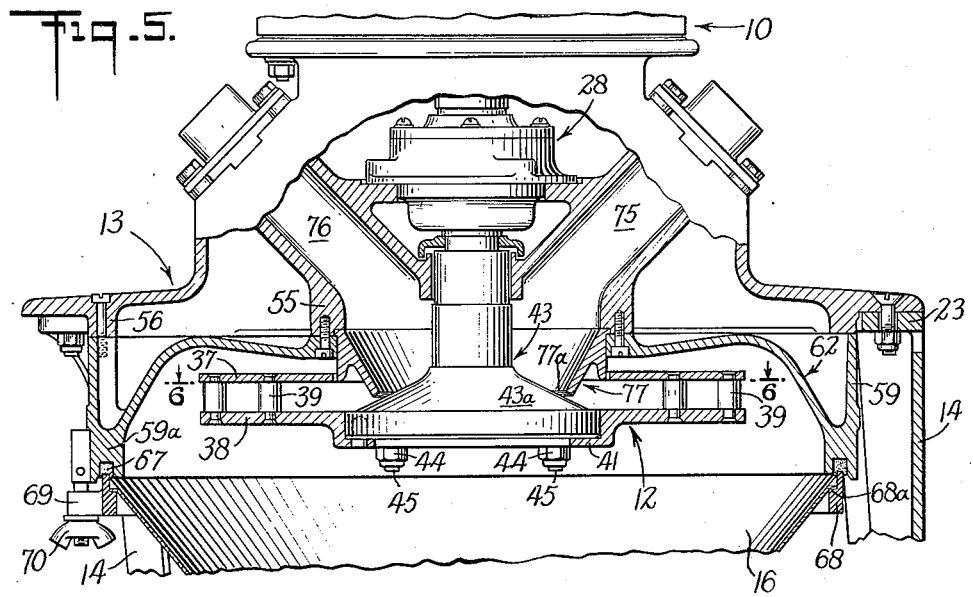
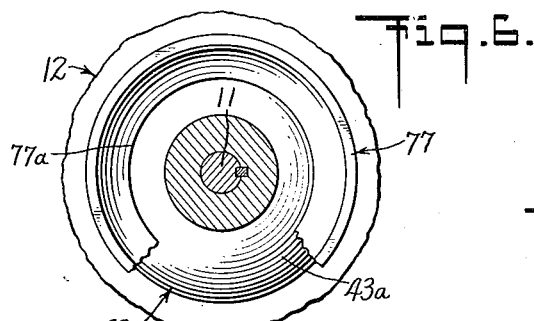
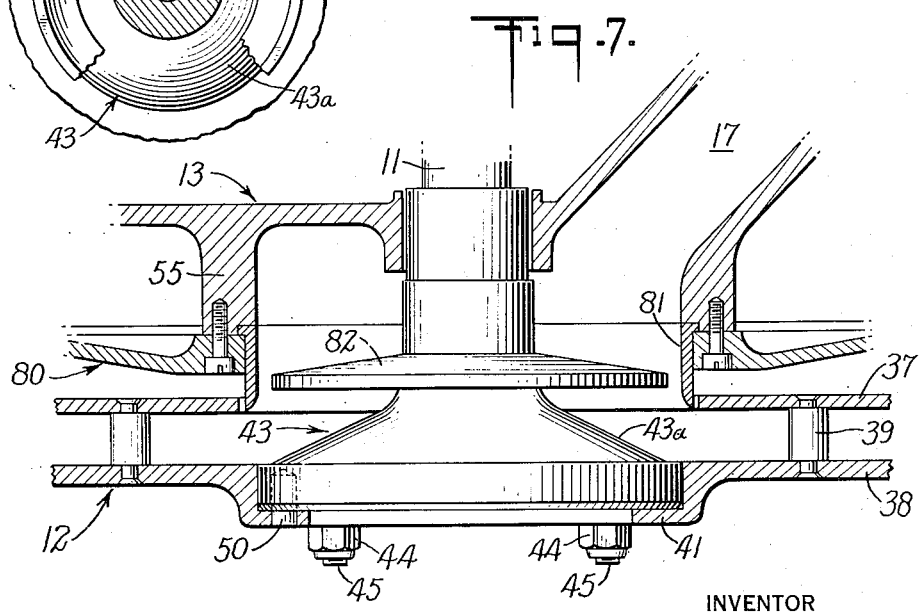
INVENTOR
George E. Hulse
BY
Blair, Curtis + Hayward
ATTORNEYS Patented Jan. 18, 1944

2,339,737

UNITED STATES PATENT OFFICE 2,339,737

INFESTATION DESTRUCTION

George E. Hulse, New Haven, Conn., assignor to The Safety Car Heating and Lighting Company, Inc., a corporation of Delaware Application January 14, 1942, Serial No. 426,721

16 Claims. (Cl. 21—91)

This invention relates to the destruction of infestation, and more in particular to a method and apparatus for destroying insect life in a product such as flour, cereals and other milled produce.

One of the objects of this invention is to provide for destroying insect life in a bulk product with apparatus which is relatively simple in construction and which is characterized by sturdiness and durability under conditions of high speed operation, and for extended periods of use. Another object is to provide apparatus of the above nature capable of treating a product such as bulk flour in such a manner as to insure total destruction of any insect life present, regardless of form of the insect life. Another object is to provide apparatus of the above nature which may readily be incorporated in and made a part of the apparatus for processing a product, such as in a flour mill, for example. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings wherein I have shown two embodiments of my invention, Figure 1 is an elevation of my machine, certain portions being shown in section and others being broken away;

Figure 4 is a greatly enlarged fragmentary section of the apparatus shown in the central portion of Figure 1, and showing the insect destroying rotor and the manner in which its drive shaft is journaled in the machine;

Figure 5 is a fragmentary vertical section of a modified form of my apparatus showing double conduits for conducting the produce to the rotor;

Figure 6 is a horizontal section taken along the line 6—6 of Figure 5; and,

Figure 7 is an enlarged fragmentary section of a modified form of one portion of my machine.

Similar reference characters refer to similar parts throughout the several views of the drawings.

Figure 1:
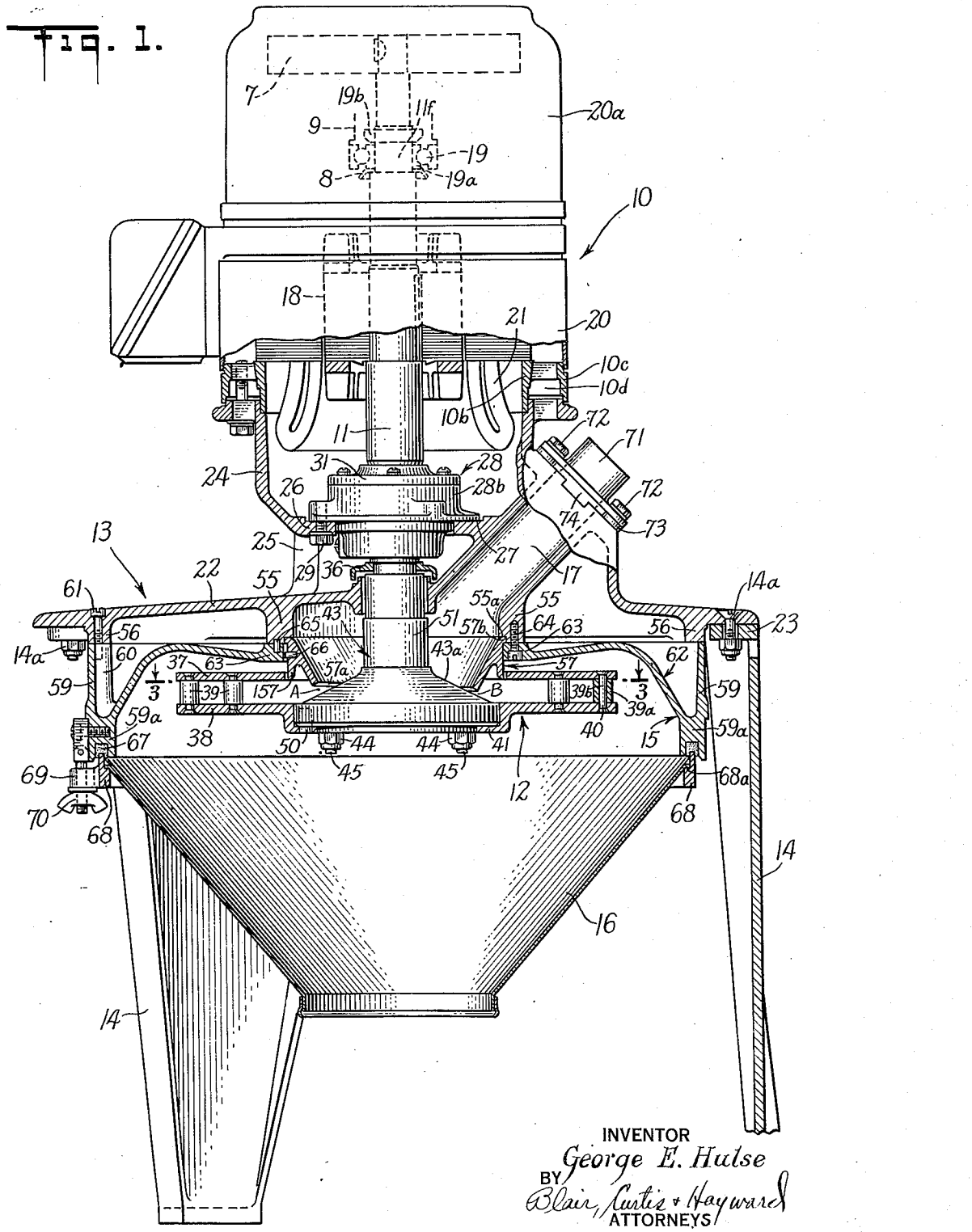

In order that certain aspects of this invention may be more readily understandable, it is first noted that some machines of this character have been characterized by a prime mover such as an electric motor which drives the insect destroying rotor by means of flexible belts or the like. Such an arrangement results in various difficulties of manufacture, assembly and operation, and also in certain complications not readily overcome. Furthermore, such a drive necessitates the provision of special conduits for conducting the produce to and from the treating area.

Machines of the character under consideration are adapted to treat a product in such a manner that the infestation is physically mutilated and thereby destroyed. The physical mutilation is inflicted by passing the product through a treatment zone, and during this movement impacting, squeezing, or otherwise maltreating the various forms of infestation. The treatment zone is formed by an annular rotor which is rotated at a high speed such, for example, as 3,450 R. P. M., and the product is fed to the center of the rotor and is thrown outwardly as a result of the rotation. In the specific embodiments under consideration, the rotation of the rotor not only moves the product to and through the treatment zone, but in addition it is responsible for inflicting the life-destroying mutilation upon the infestation. In carrying out the invention, it may be desirable to destroy the insect life or infestation without changing the character of the product in any manner, or it may be desirable to carry on a predetermined controlled process such, for example, as milling, blending, etc. In all events, it is important from a commercial standpoint to effect a total destruction of the infestation, for if this treatment is anything less than 100 per cent effective, the produce cannot be stored without danger of re-infestation.

In destroying insect life in this manner, each portion of the product must be given a thorough treatment; however, it is important that the apparatus be used efficiently, as large quantities of the product must be handled and the apparatus must not occupy a large amount of space. To obtain this thorough action in an efficient manner, the entire rotor must be used at all times, and thus, it has been found that it is highly important to provide for the effective and dependable distribution of the product. For example, if the product is improperly distributed, with the result that an excessive quantity passes through one portion of the rotor, the product may cushion the mutilating action so that there is no complete life-destroying mutilation, and, as a result, some of the insect life may pass through the treatment zone without being destroyed. The possibility of such a cushioning action becomes more likely when the apparatus is being used to treat the product at the maximum rate. Furthermore, under such circumstances it is highly important that the product be properly distributed in order to prevent congestion in localized portions of the apparatus, as such congestion might stop all flow. All of this gives rise to a real problem of uniform distribution of the product as it is delivered to the treatment zone. It is toward the end of obviating the above difficulties and solving the problems mentioned, in addition to others, that the present invention is directed.

Referring particularly to Figure 1, the machine is provided with a base generally indicated at 13, mounted upon three legs 14, and providing a mounting at the top for a motor 10, and at the central portion a mounting for a rotor 12. Rotor 12 is rigidly carried upon the lower end of shaft 11 which extends upwardly and carries the rotor 18 of the driving motor 10. Base 13 has integrally formed therein a conduit 17 through which the product to be treated is delivered to the apparatus. Mounted beneath rotor 12 upon base 13 is a hopper 16 into which the product falls as it is discharged from the rotor. The product may flow from hopper 16 into bags or other containers, or it may pass into a suitable conduit. When desired, the apparatus may be mounted upon the top of a bin in which case hopper 16 and legs 14 are dispensed with and rotor 12 discharges directly into the bin.

Figure 2:
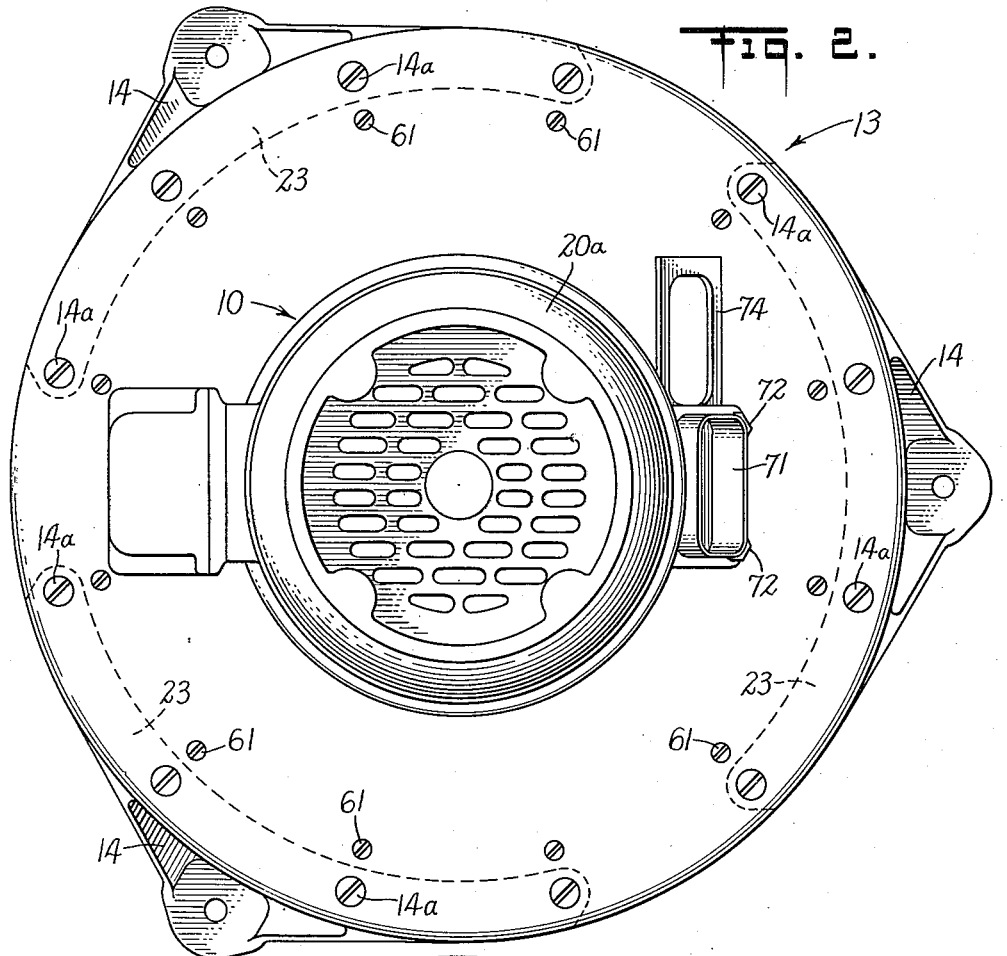
Figure 2 is an enlarged top plan view of the machine shown in Figure 1.

Base 13 is formed by a lower frame 22 and an upper frame 24 which is supported by a web structure 25. The flanged periphery of the lower frame 22 provides three equally spaced shoulders 23 (see also Figure 2) which rest upon and are bolted to the three legs 14 by bolts 14a. The upper frame 24 is provided with a transverse annular web 26 into which is machined a seta 27 for a bearing and packing gland assembly 28, which supports the lower end of shaft 11. Extending upwardly from upper frame 24 is a motor shell 20 which carries the motor stator 21, and at the upper end of which is an upper shell 20a which has a grilled top (see Figure 2). As shown in broken lines in Figure 1, the upper end of shaft 11 extends through and is supported by a ball bearing unit 19 having an inner race 19a clamped to the reduced extension 11f of the shaft by a lock nut 19b. The outer race of ball bearing unit 19 is supported upon a frame structure 9 extending upwardly from the base. Directly beneath ball bearing unit 19 is an oil flinger 8, which prevents the seeping of oil down shaft 11. The motor stator 21 is mounted in a suitable frame 10b which is spaced from the outer frame portion 10c of shell 20, to provide an annular passage 10d about the motor. Mounted upon the extreme upper end of shaft 11 is a fan 7 which directs a current of cooling air through the motor and passage 10d, and through and about the adjacent portions of the base 13.

The details of construction of the central portion of the apparatus are shown best in Figure 4, where it is seen that shaft 11 is provided with stepped reduced portions 11b, 11c, 11d, 11e, 11g, and 11h, the portions 11d and 11h being threaded and the portion 11g being tapered. The ball bearing and packing gland assembly 28 has a flanged shell 28b, the periphery of which is secured by a plurality of machine screws 29 to the seat 27 of web 26. A ball bearing assembly 30 is enclosed in shell 28b with its inner race clamped to the threaded portion 11c of shaft 11 by a lock nut and washer unit 32, and its outer race clamped to the shell 28b by a cap 31 which fits the shaft and is held in place by screws 31a and 31b. Shell 28b has at its lower portion an inwardly extending flange structure 28a which is provided with a grease groove 33 and a recess to receive a packing gland 34, which is held in proper position by a snap ring 35. This packing gland closely embraces shaft 11 and precludes the flow of lubricant downwardly along the shaft. Beneath this packing gland on the reduced portion 11e of the shaft is a flinger 36 which is positioned within a downwardly extending skirt of the shell 28b. Thus, if any lubricant should pass down the shaft below packing gland 34, it is intercepted by flinger 36 and is thrown outwardly so that the lubricant is disposed of without danger of it passing to the rotor.

From the above it may be seen that the outer race of bearing 30 is securely locked in shell 28b and that the inner race of the bearing is securely locked on reduced portion 11c of shaft 11 so that the shaft is rigidly supported against lateral displacement and also the thrust exerted by the shaft is amply supported by the bearing. It should also be noted that shaft 11 is much heavier than normally would be employed with a motor of the size and power of motor 10, so that extreme rigidity of the shaft is provided to avoid any possibility of whip during the high speed operation of the machine. Motor 10 may under certain circumstances be of seven horsepower and designed to operate at a speed of 3,450 revolutions per minute. Accordingly, inasmuch as bearing 30 is the principal support not only of shaft 11 and motor rotor 18, but also supports treatment rotor 12, the bearing is of sufficient sturdiness to accommodate the substantial load it bears during operation.

Figure 3:
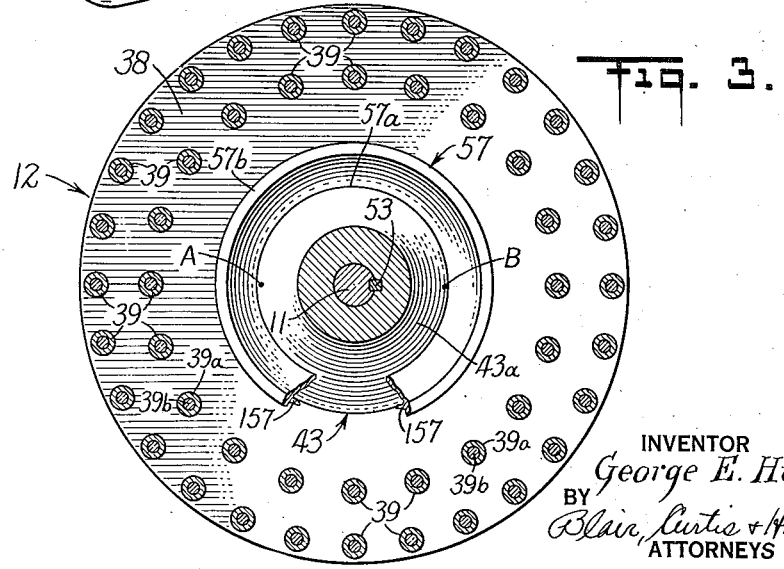
Figure 3 is a horizontal section taken along the line 3—3 of Figure 1.

Rotor 12 is provided with upper and lower plates 37 and 38, respectively, secured together in spaced relation by a plurality of impactors 39. Each of impactors 39 is preferably cylindrical in shape and is formed by a hardened steel sleeve 39a and a rivet 39b which has oppositely extending reduced necks 40 which extend into countersunk holes formed in rotor plates 37 and 38. The ends of the necks are headed over and thus clamp the rotor plates against the opposite sides of the cylindrical sleeve portion of the impactor. As is more clearly shown in Figure 3, two rows of impactors 39 are provided, and preferably there is a lesser number of impactors in the inner row than in the outer row. The impactors in the two rows are not in radial alignment, and form a tortuous path radially outwardly of rotor 12, all for a purpose which will be described below.

Referring again to Figure 4, rotor 12 is carried by a mounting hub 43 which is formed by an upper cylindrical portion 51 and a lower flared end 42. The flared end 42 fits within the center of the lower plate 38, and the lower plate is provided with an integral flanged shoulder 41 extending inwardly beneath the end of the flared end 42. A plurality of studs 45 are secured to and extend downwardly from the flared end 42, and extend through shoulder 41 with nuts 44 threaded onto the ends of the studs and securing the lower plate 38 to the hub. A dowell pin 50 extends through flange 41 and the adjacent portion of flared end 42, and assures the proper positioning of the rotor and hub 43. The cylindrical portion 51 of the hub has a tapered bore which fits the tapered portion 11g of shaft 11, and the hub is held securely to the shaft by a lock nut 52, locked by a cotter pin 54. The cylindrical portion 51 and the shaft are provided with suitable keyways for the reception of a key 53 which prevents relative rotation between these parts. Thus the rotor, as a unitary structure, including the hub 43, the plates 37 and 38, and the impactors 39, is rigidly secured to the shaft 11.

Referring to the right-hand portion of Figure 1, liner 15 includes a dome, generally indicated at 62, extending from a thickened inner ring 63 to an outer supporting ring 59a. Extending upwardly from ring 59a is a cylindrical portion 59 which (see the left-hand portion of the figure) has inwardly extending bosses 60 cast integrally therewith. Extending downwardly from the lower base portion 22 at the inner edge of liner 15 is an annular inner web 55, against which liner 15 is secured (see the right-hand portion of the figure) by a plurality of screws 64. Similarly, at the outer edge of the lower base portion 22 is a downwardly extending annular outer web 56 to which the cylindrical portion 59 of the liner 15 is attached (see the left-hand side of the figure) by screws 61. Screws 61 are so positioned that they extend into bosses 60 to thereby provide a rigid support. The inner lower portion of web 55 is rabbetted (see also the right-hand portion of Figure 4) at 55a to snugly receive the upper flange 57b of a product distributor generally indicated at 57. The inner edge of the liner 15 extends beneath flange 57b on the distributor to thereby secure the distributor in place. The mating portions of web 55 and liner 15 (see the left-hand portion of the figure) are recessed to receive a dowell pin 65, which insures that the two members will be properly positioned with respect to each other. Similarly distributor 57 carries a dowell pin 66 which is received in a slot 63a cut in the edge of the liner to thereby insure that these members will be in proper relative position.

As is more clearly shown in the left-hand portion of Figure 1, the ring 59a of liner 15 is grooved to provide a recess for packing material 67 against which the upper edge of a hopper supporting ring 68 seats. Ring 68 is provided with a suitable number of bosses 69 which coact with swing nuts 70 secured to liner 15 and operable to detachably secure ring 68 thereto. This ring is provided with a shoulder 68a (see also the right-hand portion of the figure) which carries hopper 16 by suitable flanges extending therefrom and resting on the shoulder. Thus, hopper 16 is removably secured to liner 15 and when secured thereto, is sealed by packing 67.

As noted hereinabove, one of the most difficult problems encountered in treating machinery of this character is that of obtaining proper distribution of the product in the treating area of the machine. To obtain total destruction of the insects in the product, the product must be delivered to the impactors in the treating rotor in such a manner that every particle of the product as well as every insect, regardless of its stage of development, is engaged by one or more of the impactors. If too much product is fed to the impactors per unit of time, there is the danger that the insect life will be cushioned and accordingly protected by the excess product and pass through the impactors unharmed. On the other hand, if the film of product delivered to the impactors is too thin, the treating capacity of the machine is so greatly reduced as to make it uneconomical.

These problems are complicated when it is necessary, as in the present case, to feed the product into one side of the machine, as this gives rise to a tendency for the greatest amount of the product to enter that side of the treatment rotor which at that instant is nearest the inlet, possibly even resulting in congestion at one portion of the rotor. To the end of attaining uniform product distribution to the treatment rotor, and accordingly avoiding congestion at any particular portion thereof, distributor 57 (Figure 4) is preferably in the form of the frustum of an inverted cone. The larger opening of distributor 57 communicates directly with the product conduit or inlet 17, whereas the smaller end 57a of the distributor is adjacent the downwardly sloping surface 43a of rotor hub 43. The distance that distributor edge 57a is spaced from rotor surface 43a may be varied in accordance with the type of product being treated, the amount thereof to be treated within a given time, and with the speed at which rotor 12 is operated.

Because of the fact that the product is fed to one side of the rotor through inlet 17, there is a tendency for the product to become congested at that side of the rotor directly under the inlet. To alleviate this congestion and assure uniform distribution of the product to the rotor, distributor 57 is so machined that the space between edge 57a of the distributor and surface 43a of the rotor is greater at point A opposite inlet 17 than at point B directly beneath the inlet.

As a result of the high speed at which the treating rotor 12 operates, the rotor acts as a centrifugal air pump drawing air from over distributor 57 and thereby creating a partial vacuum within distributor 57 and conduit 17. This partial vacuum within the distributor and that portion of base 13 immediately above the distributor is not uniform, however, because there is greater space between distributor edge 57a and the rotor at point A than there is between the edge 57a and the rotor at point B. The greater spacing at point A permits more air to flow between the distributor and rotor at that point, and, therefore, the partial vacuum in the adjacent portions of the distributor is somewhat greater than in that portion of the distributor adjacent point B. Accordingly, as the product flows into the distributor from conduit 17, the greater partial vacuum in the distributor adjacent point A draws air and a large portion of the product away from point B toward point A, thus to relieve congestion at point B, and giving uniform product distribution. It follows that the film of produce whirled outwardly by surface 43a of the rotor under distributor edge 57a is of substantially uniform thickness.

On its outer surface, distributor 57 is provided with a cylindrical portion 157 which extends downwardly from the inner edge of liner 15. The lower edge of portion 157 is flush with the lower surface of rotor plate 37. There is sufficient clearance between the outer surface of portion 157 and the adjacent edge of plate 37 to avoid the possibility of interference, but at the same time the product will not pass upwardly out of the rotor. As indicated above, there is a tendency for the rotor to act as an air pump, and the parts adjacent the treatment zone including liner 15 and distributor 57 are so proportioned as to avoid excessive eddy currents, etc. The partial vacuum condition which is created on the intake side of the rotor causes a slight air flow down about shaft 11 and into any other air openings. Thus, the product, and particularly that which includes infestation, does not pass from the machine.

As the product is thus uniformly fed into the rotor 12, the centrifugal force imparted to the produce thrusts it outwardly in a uniform film between rotor plates 37 and 38 toward impactors 39. As described above, there is no direct radial path, but rather a plurality of tortuous paths from the center of the rotor through the impactors. While the film of the product is passing outwardly past the impactors every minute particle thereof is violently engaged by one or more impactors and accordingly any infestation carried by the produce is engaged by one or more of the impactors. These impactors inflict upon the insect life severe physical mutilation with the resultant destruction of all of the insect life, regardless of its stage. This destruction is accomplished without impairing the quality of the product. After the product and any infestation carried thereby is passed through impactors 39 (Figure 1), it is passed toward liner 62 and falls into hopper 16 from which it may flow into bins or containers as desired.

It may now be seen that product fed to treating rotor 12 through conduit 17 is uniformly distributed to the treating rotor and that the film of product is so operated on by impactors 39 and the sides of liner 62 (Figure 1) that any infestation, regardless of its stage of development, contained in the product is completely destroyed.

The upper end of conduit 17 carries a connection flange 71 attached thereto by machine screws 72. Between flange 71 and that portion of machine base 13 which forms the upper end of the conduit is clamped a spacer 73 which is of suitable form to provide a track or guide for a slide valve 74. This slide valve (see also Figure 2) is closed when the machine is not in operation and prevents infestation from passing to and collecting in conduit 17, distributor 57, and that portion of base 13 immediately overlying the distributor. If infestation is permitted to collect, it might, during initial starting operation of the machine, pass through the treating rotor 12 at such a low rate of speed that the infestation would not be destroyed. Through the provision of slide valve 74, rotor 12 may attain its proper operative speed before the product is permitted to flow thereto, thus precluding any possibility of any infested product passing through the machine without proper treatment.

Under certain circumstances, it is desired to increase substantially the treating capacity of the machine, as, for example, where capacities of over fifty barrels of product per hour are required.

Accordingly, I have provided the machine shown in Figure 5 which is similar in all respects to the machine heretofore described, except that in the machine of Figure 5 I provide two produce inlets 75 and 76. The provision of two inlets or feed conduits, such as conduit 17 (Figure 4) necessitates, of course, a modified form of the machine base 13, but otherwise the apparatus is substantially the same as described above. However, as shown in Figures 5 and 6, the product distributor generally indicated at 77 also differs somewhat from distributor 57 of Figure 4. This distributor 77 is so formed that all portions of its lower edge 77a are equally spaced from the upper surface of rotor hub 43a, as I have found that where two inlet conduits are used it is unnecessary to provide the uneven spacing, i. e. the non-uniform opening between distributor edge and the rotor hub as described hereinbefore in connection with distributor edge 57a in Figure 4. The provision of the two conduits 75 and 76 results in what might be termed a balanced feed which obviates certain of the product distribution difficulties resulting from the use of a single feed conduit.

The machines hereinabove described are particularly well adapted to the treatment of a product such as flour and corn meal, i. e., materials, the individual particles of which are relatively fine. Certain mill streams, however, are devoted to the production of coarser produce and for such produce, in order to utilize the full potential capacity of my machine, I have provided a modified form of distributor as shown in Figure 7. In the machine shown in Figure 7, base 13, rotor 12, and shaft 11 are substantially as described above. However, I provide a liner generally indicated at 80 which, in many respects is similar to the liner 62 in Figure 1, but differs in that it includes, as shown in Figure 7, a depending flange or throat 81 which extends downwardly from that portion of the base 13 enclosed by ring or web 55. Throat 81 accordingly surrounds shaft 11 and extends downwardly through rotor plate 37 to a point preferably in the plane of the under surface of rotor plate 37. Thus, base ring 55 and throat 81 form a chamber into which the produce flows from inlet conduit 17.

Secured to, so as to rotate with shaft 11 is a distributor plate 82 which is frusto-conical in shape and which rests on the top of rotor hub 43. The diameter of distributor plate 82 is such that it provides a restriction within throat 81, i. e. the distributor plate 82 forms a relatively narrow, annular slot through which the product from conduit 17 must flow before it passes to the treatment zone of rotor 12. Thus, as the product flows down from conduit 17 it first engages distributor plate 82 which, by reason of its rapid rotation, distributes the product uniformly about its periphery so that a uniform film of product flows through the relatively narrow annular slot formed by the distributor plate. This insures uniform distribution of the product to the rotor 12 for the purpose described hereinbefore. By its construction, the machine can accommodate maximum amounts of coarser products, and uniform distribution is assured.

It may now be seen that in the machines described hereinabove I have provided product treating apparatus which effectively attains the several objects hereinabove set forth in a thoroughly practical and efficient manner.

As many possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. In apparatus for destroying infestation in a product, in combination, a base, a casing mounted on top of said base, a motor mounted in said casing, means for cooling said motor during operation thereof, said motor having a heavy armature shaft, an anti-friction bearing secured to said casing for journaling the upper end of said shaft, a heavy anti-friction bearing housed in said base for journaling the lower end of said shaft, means forming an oil seal about said shaft and said lower bearing, a treating rotor secured to the lower end of said shaft, a casing secured to the under side of said base and surrounding said rotor, a product inlet conduit formed in said base and adapted to deliver the product to said rotor, and a distributor secured to said base adjacent the upper central portion of said rotor and adjacent the delivery end of said inlet for receiving the product from said inlet and for distributing it uniformly to said rotor, the delivery end of said distributor being positioned adjacent the center portions of said rotor, one portion of the delivery end of said distributor being further spaced from said rotor portion than that portion of the delivery end of said distributor immediately underlying said inlet.

2. In apparatus for destroying infestation in a product, in combination, a base, driving means mounted on said base and having a shaft extending downwardly therefrom, means forming a product inlet conduit at one side of said base, the axis of said conduit extending diagonally upwardly of the axis of said shaft, a treating rotor secured to the lower end of said shaft in a position to receive a product from said conduit, said rotor including a frusto-conical hub portion, a distributor secured to said base between the delivery end of said conduit and the upper surface of said rotor hub, one portion of the lower edge of said distributor being spaced farther from said hub than that portion of the distributor edge immediately underlying said conduit whereby the opening between the lower distributor edge and the rotor hub is less restricted at that portion thereof farthest from said conduit to effect uniform distribution of the product to said rotor, and a hopper beneath said rotor for receiving the product treated thereby.

3. In apparatus for destroying infestation in a product, in combination, a base, driving means mounted on said base including a shaft extending downwardly through said base, a treating rotor secured to the lower end of said shaft, means forming an inlet conduit for delivering a product to said rotor, said rotor being adapted to operate at a high speed to create a partial vacuum in said base above said rotor, and means on said base adjacent said rotor for increasing the partial vacuum on that side of said shaft in said base farthest removed from said conduit to relieve congestion of the product immediately below said conduit, and means surrounding said rotor for receiving the produce treated thereby.

4. In apparatus for destroying infestation in a product, in combination, a base, a motor mounted on said base, said motor including an armature shaft extending downwardly through said base, a treating rotor secured to the lower end of said shaft, means forming a product receiving chamber immediately above the central portion of said rotor, an inlet conduit for delivering the product to said chamber, and means forming a restricted opening between said chamber and said rotor, said opening being narrower at that point thereof immediately underlying the delivery end of said conduit than at that portion thereof farthest removed from said conduit whereby the product may flow more freely through the wider portion of said opening to relieve congestion at the narrower portion of said opening.

5. In apparatus for destroying infestation in a product, in combination, a base, driving means mounted on said base including a shaft, a produce treating rotor secured to one end of said shaft and adapted upon rotation to pass the product therethrough, said rotor including a plurality of impactors adapted to engage any infestation carried by the product during its passage through said rotor to physically mutilate and thereby destroy said infestation, wall means surrounding said rotor to receive the product passing through said rotor, and including a wall slanting downwardly and outwardly from said rotor, and means secured to said wall means for receiving the product therefrom.

6. In apparatus for destroying infestation in a product, in combination, a base, a motor mounted on said base and including an armature shaft extending downwardly therethrough, a treating rotor secured to the lower end of said shaft, means forming with a portion of said base a chamber immediately above said rotor and adapted to receive the product to be treated, means forming a pair of conduits beside said motor on the top of said base and extending through said base for delivering the product to said chamber, the axes of said inlet conduits being diagonal to the axis of said shaft, and means forming a restricted opening between said chamber and said rotor.

7. In apparatus of the character described, a treating rotor for a machine for destroying infestation in a product, said rotor comprising, in combination, an upper plate having a central opening formed therein, a lower plate, a hub secured to said lower plate and extending therefrom toward said opening in said upper plate, and a plurality of impactors disposed between said plates and secured thereto, said impactors being out of alignment radially of said plates so as to provide a plurality of tortuous paths through the space between said plates.

8. As an article of manufacture, a treating rotor for a machine for destroying infestation in a product, said rotor comprising, in combination, a first plate, a second plate having an opening therein to admit the flow of a product between said plates, a plurality of impactors disposed between said plates and secured thereto, said impactors being arranged in a plurality of concentric rows but out of radial alignment with one another so as to provide in the space between said plates a plurality of tortuous paths through which the product is adapted to flow upon rotation of the rotor.

9. As an article of manufacture, a treating rotor for a machine for destroying infestation in a product composed of individual particles, said rotor comprising, in combination, a first plate, a second plate having an opening therein to admit the flow of a product between said plates, and a plurality of impactors disposed between said plates and secured thereto, said impactors being arranged in a plurality of concentric rows, the innermost of which is closer to the periphery of said rotor than to the axis thereof whereby there is a substantial space between the rotor axis and said innermost row of impactors through which the individual particles of the product can attain momentum prior to being engaged by said impactors.

10. As an article of manufacture, a treating rotor for a machine for destroying infestation in a product composed of individual particles, said rotor comprising, in combination, a first plate, a second plate having an opening therein to admit the flow of a product between said plates, and a plurality of impactors disposed between said plates and secured thereto, said impactors being arranged in a plurality of concentric rows, the innermost of which is closer to the periphery of said rotor than to the axis thereof whereby there is a substantial space between the rotor axis and said innermost row of impactors through which the individual particles of the product can attain momentum prior to being engaged by said impactors, said impactors being so disposed between said plates as to be out of radial alignment with one another thereby to provide in the space between said plates a plurality of tortuous paths through which the product is adapted to flow upon rotation of the rotor.

11. In apparatus for destroying infestation in a product, in combination, a base, driving means mounted on said base including a shaft, an antifriction bearing housed in said base for journaling said shaft, means forming an oil seal about said shaft and said bearing, a treating rotor secured to said shaft below said bearing, a casing secured to the under side of said base and surrounding said rotor, a product inlet conduit formed in said base and adapted to deliver the product to said rotor, and a distributor secured to said base adjacent the upper central portion of said rotor and adjacent the delivery end of said inlet for receiving the product from said inlet and for distributing it uniformly to said rotor, the delivery end of said distributor being further spaced from said rotor portion than that portion of the delivery end of said distributor immediately underlying said inlet.

12. In apparatus for destroying infestation in a product, in combination, a base, a treating rotor including a frusto-conical hub portion rotatably mounted beneath said base, means forming a product inlet conduit extending from the top side of said base through said base to discharge the product on said hub portion of said rotor, the axis of said conduit extending diagonally upwardly of the axis of said shaft, and a distributor secured to said base between the delivery end of said conduit and the upper surface of said rotor hub, one portion of the lower edge of said distributor being spaced farther from said hub than that portion of the distributor edge immediately underlying said conduit whereby the opening between the lower distributor edge and the rotor hub is less restricted at that portion thereof farthest from said conduit to effect uniform distribution of the product to said rotor.

13. In apparatus for destroying infection in a product, in combination, a base, a treating rotor rotatably mounted on said base, means forming a product-receiving chamber immediately above the central portion of said rotor, an inlet conduit for deliverying the product to said chamber, and means forming a restricted opening between said chamber and said rotor, said opening being narrower at that point thereof immediately underlying the delivery end of said conduit than at that portion thereof farthest removed from said conduit whereby the product may flow more freely through the wider portion of said opening to relieve congestion at the narrower portion of said opening.

14. In apparatus for destroying infestation in a product, in combination, a base, a treating rotor rotatably mounted on said base, means forming with a portion of said base a chamber immediately above said rotor and adapted to receive the product to be treated, means forming a pair of conduits in said base for delivering the product to said chamber, the axes of said conduits being diagonal to the axis of said rotor, and means forming a restricted opening between said chamber and said rotor.

15. In apparatus for effecting the destruction of all insect life in a flowable product composed of individual solid parts, the combination of, a rotary treating device having two axially spaced plates, the opposed surfaces of which define a treating space, the minimum dimension between said surfaces being greater than the maximum dimension of the parts of the product, a plurality of spaced impacting members radially spaced from said opening and spanning said treating space between said axially spaced surfaces, one of said plates having a central annular inlet opening, means forming a product-receiving chamber immediately above the central portion of said treating device, an inlet conduit for delivering the product to said chamber, means forming a restricted opening between said chamber and said device, said opening being narrower at that point thereof immediately underlying the delivery end of said conduit than at that portion thereof farthest removed from said conduit whereby the product may flow more freely through the wider portion of said opening to relieve congestion at the narrower portion of said opening, said treating device having a discharge opening at the outer periphery thereof, and means to rotate said treating device to centrifugally propel the product axially from the axis of rotation and to rotate said impacting members to thereby provide a forcible impact between each particle of insect life and at least one of said impacting members to inflict lethal trauma on all insect life in the product, said apparatus including a product outlet extending substantially around said treating device through which the product falls away from said treating device.

16. In apparatus for effecting the destruction of all insect life in a flowable product composed of individual solid parts, the combination of, a rotary treating device having two axially spaced plates, the opposed surfaces of which define a treating space, the minimum dimension between said surfaces being greater than the maximum dimension of the parts of the product, a plurality of spaced impacting members radially spaced from said opening and spanning said treating space between said axially spaced surfaces, one of said plates having a central annular inlet opening, said treating device having a hub portion substantially frusto-conical in shape, means forming a product inlet conduit opening above said hub portion, the axis of said conduit extending diagonally upward of the axis of said treating device, a distributor disposed between the delivery end of said conduit and said hub portion, one portion of the lower edge of said distributor being spaced farther from said hub than that portion of the distributor edge immediately underlying said conduit whereby the opening between the lower distributor edge and the hub portion is less restricted at that portion thereof farthest from said conduit to effect a uniform distribution of the product to said treating device, said treating device having a discharge opening at the outer periphery thereof, and means to rotate said treating device to centrifugally propel the product away from the axis of rotation and to rotate said impacting members to thereby provide a forcible impact between each particle of insect life and at least one of said impacting members to inflict lethal trauma upon all insect life in the product, said apparatus including a product outlet extending substantially around said treating device through which the product falls away from said treating device.

GEORGE E. HULSE.